United States Patent
Hayashi et al.

(10) Patent No.: US 9,512,928 B2
(45) Date of Patent: Dec. 6, 2016

(54) VALVE AND CONSTRUCTION MACHINE WITH THE SAME

(71) Applicant: KOBELCO CONSTRUCTION MACHINERY CO., LTD., Hiroshima-shi (JP)

(72) Inventors: Ryosuke Hayashi, Hiroshima (JP); Katsuya Irieda, Hiroshima (JP); Akihiko Eita, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 47 days.

(21) Appl. No.: 14/603,899

(22) Filed: Jan. 23, 2015

(65) Prior Publication Data
US 2015/0211643 A1  Jul. 30, 2015

(30) Foreign Application Priority Data
Jan. 27, 2014 (JP) .................................. 2014-012026

(51) Int. Cl.
F16K 5/04 (2006.01)
F16K 5/10 (2006.01)
F16K 47/04 (2006.01)

(52) U.S. Cl.
CPC ............... *F16K 5/0407* (2013.01); *F16K 5/10* (2013.01); *F16K 47/045* (2013.01)

(58) Field of Classification Search
CPC ............ F16K 5/0407; F16K 1/52; F16K 1/50; F16K 1/523; F16K 5/0207; F16K 5/04; F16K 5/06; F16K 5/02; F16K 5/0605; F16K 5/0242; F16K 5/0442; F16K 5/0647; F16K 35/027
(Continued)

(56) References Cited

U.S. PATENT DOCUMENTS 3,542,337 A * 11/1970 Scaramucci .......... F16K 5/0605
                                                            251/209
3,572,383 A    3/1971 Natalizia
(Continued)

FOREIGN PATENT DOCUMENTS

DE   1 930 733 A1   1/1970
JP   2 23056 U      2/1990

OTHER PUBLICATIONS

Extended European Search Report issued Jul. 28, 2015 in Patent Application No. 15152452.7.

*Primary Examiner* — Michael R Reid
(74) *Attorney, Agent, or Firm* — Oblon, McClelland, Maier & Neustadt, L.L.P.

(57) ABSTRACT

Provided is a valve restrained from unintentional close. The valve includes a valve element formed with a flow-path hole, a holding member having inlet and outlet ports and holding the valve element while permitting its rotational movement in first and second directions, and a rotational restriction section. The valve element has an open position for making communication between the ports through the flow-path hole and a close position for blocking between the ports. The rotational restriction section restricts the rotational movement so as to stop the rotational movement thereof in the first direction at the open position where a specific part of the outer peripheral surface of the valve element overlaps the inlet port and receives pressure of the liquid to allow the pressure to impart a rotational bias in the first direction to the valve element in the open position.

10 Claims, 8 Drawing Sheets

(58) Field of Classification Search
USPC .................. 251/284–288, 290, 309, 315.01,
315.07,251/160, 175, 192, 205, 208, 209,
289, 283,251/314.352
See application file for complete search history.

(56) References Cited

U.S. PATENT DOCUMENTS

| | | | | |
|---|---|---|---|---|
| 3,700,003 A | * | 10/1972 | Smith | .................. F16K 5/0207 |
| | | | | 251/207 |
| 5,305,988 A | * | 4/1994 | Cox | ........................ F16K 5/185 |
| | | | | 251/309 |
| 8,534,360 B2 | * | 9/2013 | Kalb | ...................... E21B 34/06 |
| | | | | 251/208 |

* cited by examiner

VALVE AND CONSTRUCTION MACHINE WITH THE SAME

BACKGROUND OF INVENTION

1. Technical Field

The present invention relates to a valve which regulates a flow of liquid in a flow pipe and a construction machine with the valve.

2. Background Art

There are many flow pipes which are provided with various valves for regulating flow of liquid. For example, Japanese Utility Model Application Publication No. H2-23056 discloses a hydraulic excavator including a front attachment with a tip portion to be connected to a special working implement such as a crusher can be mounted, a high-flow-rate pipe disposed along the front attachment to supply hydraulic liquid to the special working implement, and a stop valve provided downstream of the high-flow-rate pipe. The stop valve is opened when the special working implement is mounted to the front attachment and is otherwise closed.

Figure 8:
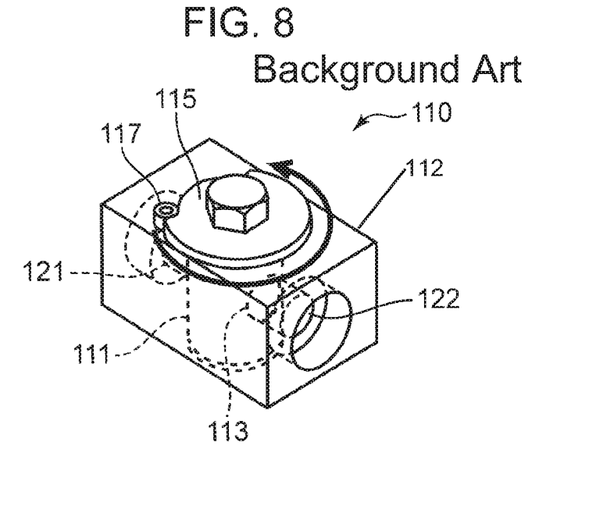
FIG. 8 is a perspective view of a conventional stop valve.

As a valve such as the stop valve which is provided in the flow pipe, known is one shown in FIG. 8, namely, a valve 110. The valve 110 has a valve element 111, which is formed with a flow-path hole 113, and a block 112 which is a holding member for holding the valve element 111 so as to allow the valve element 111 to be rotated about a rotational axis X orthogonal to the flow-path hole 113. The valve element 111 is provided with a rotary plate 115 provided at an upper portion of the valve element 111, to which a rotational operation is applied to change the direction of the flow-path hole 113, the flow path thereby being opened or closed. Specifically, the block 112 includes an inlet port 121, which is connected to an upstream section of the flow pipe, and an outlet port 122, which is connected to a downstream section of the flow pipe.

Figure 9A:
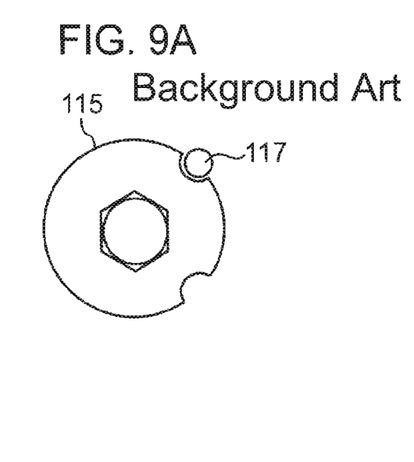
FIG. 9A is a plan view showing a state where a rotational lock section provided in the conventional stop valve locks a valve element of the stop valve at an open position.
Figure 9B:
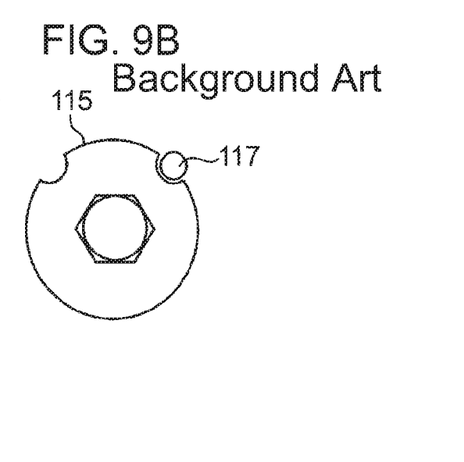
FIG. 9B is a plan view showing a state where the rotational lock section provided in the conventional stop valve locks the valve element of the stop valve at a close position.
Figure 10A:
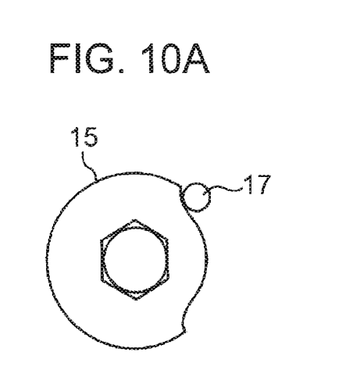
FIG. 10A is a plan view of a rotational restriction section when the valve element of the valve according to the embodiment is in the open position.
Figure 10B:
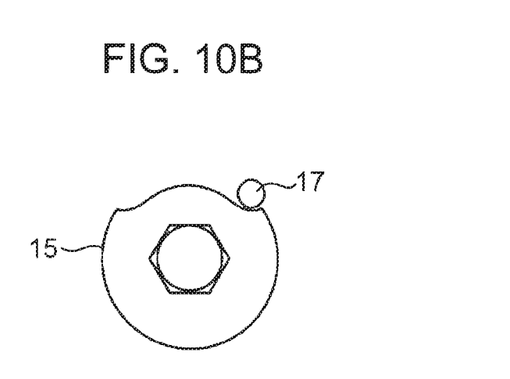
FIG. 10B is a plan view of the rotational restriction section when the valve element of the valve according to the embodiment is in the close position.

As shown in FIG. 9, the rotary plate 115 is fixed to the holding member 112 through a bolt 117, thereby allowing the valve element 111 to be locked in an open position and in a close position. This structure, while having an advantage of reliably fixing the position of the valve element 111, requires attachment/detachment of the bolt 117 with respect to the block 112 for every open/close switching, leading to reduced working efficiency. This inconvenience might be avoided by simplification or omission of the structure for locking the valve element 111 in the open position and the close position; however, either of the simplification and the omission could allow the valve element 111 in the open position to be displaced toward the close position to reduce an opening area or close the valve.

SUMMARY OF INVENTION

An object of the present invention is to provide a valve including a valve element and being capable of suppressing unintentional rotational movement of the valve element from an open position to a close position.

Provided is a valve which is provided midway of a flow pipe forming a flow path in order to regulate a flow of liquid in the flow path, the valve including: a valve element having a cylindrical outer peripheral surface centered around a rotation axis orthogonal to a direction of the flow path of the flow pipe, the valve element formed with a flow-path hole penetrating the valve element orthogonally to the rotation axis; a holding member holding the valve element while keeping close contact with the outer peripheral surface of the valve element, so as to permit the valve element to make rotational movement about the rotation axis in a first direction and in a second direction opposite to the first direction, the holding member having an inlet port to be connected to an upstream section of the flow pipe and an outlet port to be connected to a downstream section of the flow pipe, the inlet port and the outlet port located on respective opposite sides of the holding member across the valve element in a direction orthogonal to the rotation axis; and a rotational restriction section which restricts the rotational movement of the valve element about the rotation axis. The valve element has an open position where the flow-path hole brings the inlet port and the outlet port into communication with each other to open the flow path and a close position where the flow-path hole is deviated from the inlet port and the outlet port in a direction of the rotational movement to make the valve element block the communication between the inlet port and the outlet port to thereby close the flow path. The rotational restriction section restricts the rotational movement of the valve element so as to stop the rotational movement of the valve element in the first direction at the open position. The open position is a position where the outer peripheral surface of the valve element overlaps the inlet port in a specific part of the outer peripheral surface, the specific part lying at a rear side of the flow-path hole with respect to the first direction so as to receive pressure of the liquid having passed through the inlet port to allow the pressure to impart a rotational bias in the first direction to the valve element in the open position.

Also provided is a construction machine operated through hydraulic liquid, the construction machine including a flow pipe forming a flow path for the hydraulic liquid and the above-described valve, the valve being provided midway of the flow pipe to regulate flow of liquid in the flow pipe.

DESCRIPTION OF EMBODIMENTS

There will be described a valve and a construction machine provided with the valve according to an embodiment of the present invention with reference to FIGS. 1 to 7. The description below takes a hydraulic excavator and a stop valve provided therein as respective examples of the construction machine and the valve.

Figure 1:
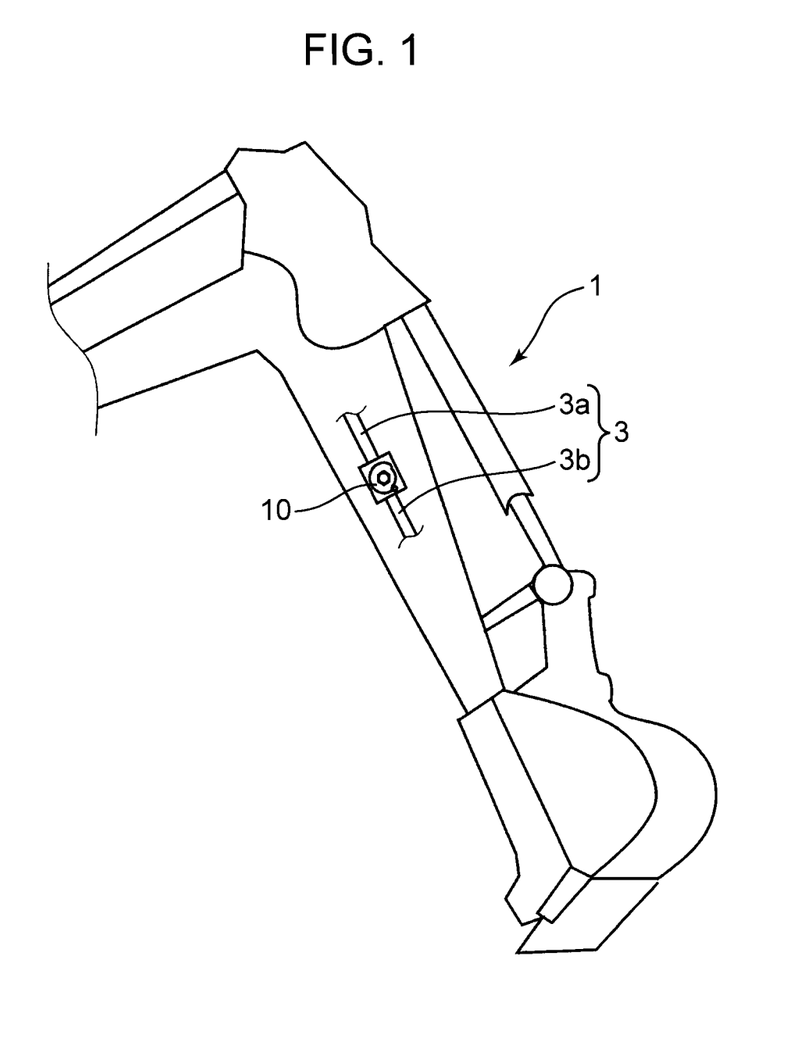
FIG. 1 is a perspective view of a front attachment of a construction machine according to an embodiment of the present invention.

FIG. 1 shows a front attachment 1 of a hydraulic excavator which is an example of the construction machine. The hydraulic excavator further includes a flow pipe 3 and a valve 10.

The flow pipe 3 is disposed along a side surface of the front attachment 1 to form a flow path for hydraulic liquid, e.g., oil.

The valve 10 is provided midway of the flow pipe 3 so as to regulate a flow of the hydraulic liquid in the flow pipe 3. The valve 10 according to the embodiment functions as a stop valve configured to be operated to open and close the flow path formed by the flow pipe 3. Specifically, for attachment and detachment of an implement with respect to a tip portion of the front attachment, the valve 10 is closed to temporarily stop the flow of the hydraulic liquid in the flow pipe 3. Subsequently, when the implement has been attached to the tip portion of the front attachment 1, the valve 10 is opened again to resume the flow of the hydraulic liquid in the flow pipe 3. As the situation where the implement is attached and detached with respect to the tip portion of the front attachment 1, can be assumed, for example, a case of detaching a bucket which had been attached to the tip portion and attaching a special working implement thereto for breaker operation.

Figure 2A:
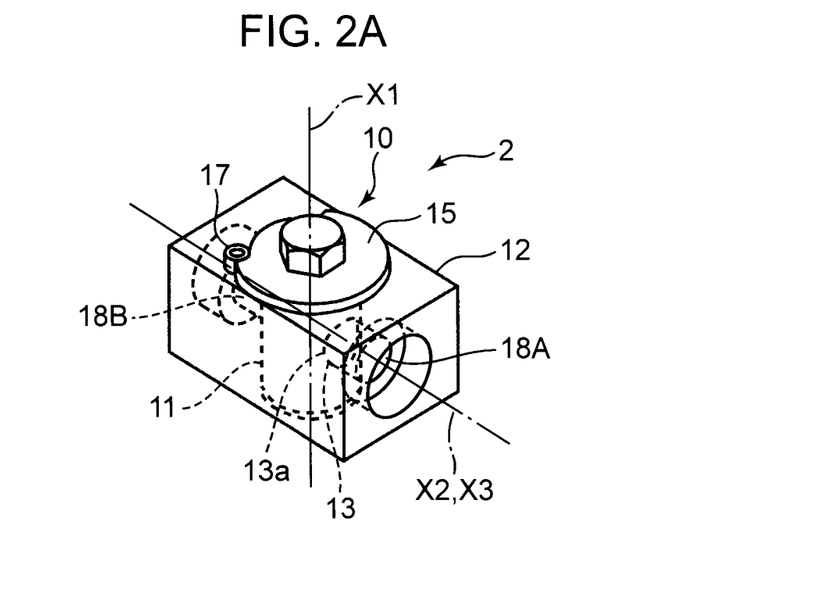
FIG. 2A is a perspective view of a valve provided in the construction machine.
Figure 2B:
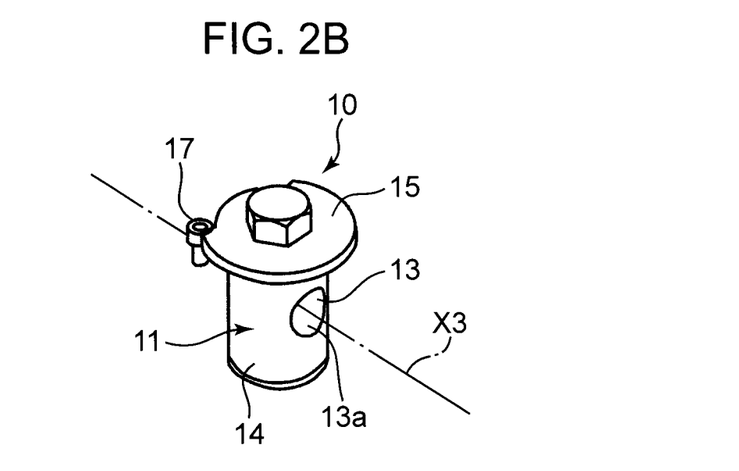
FIG. 2B is a perspective view of the whole valve except for a holding member.

As shown in FIG. 2A and FIG. 2B, the valve 10 includes a valve element 11 formed with a flow-path hole 13, a holding member 12, and a rotational restriction section including a rotary plate 15 and a bolt 17.

The valve element 11 has a cylindrical outer peripheral surface 14 centered around a predetermined rotation axis X1. In the embodiment, the valve element 11 is shaped as a cylindrical column, and the flow-path hole 13 is formed so as to penetrate the valve element 11 along an axis X3 orthogonal to the rotation axis X1. The flow-path hole 13 according to the embodiment has a cross section constant in the axial entire region thereof, specifically, a circular cross section. The valve element 11 is inserted into the holding member 12 to be held therein in such a posture that the rotation axis X1 is orthogonal to the axis X3 of the flow-path hole 13 and an axis X2 of the flow path formed by the flow pipe 3.

In this embodiment, the holding member 12 is a rectangular parallelepiped-shaped block, having an inner peripheral surface 12a which encloses a space into which the valve element 11 is inserted. The inner peripheral surface 12a is shaped as a cylinder conforming to the outer peripheral surface 14 of the valve element 11. The holding member 12 holds the valve element 11 with the close contact of the inner peripheral surface 12a and the outer peripheral surface 14 with each other, while allowing the valve element 11 to make rotational movement about the rotation axis X1 relatively to the holding member 12 involving sliding contact of the outer peripheral surface 14 with the inner peripheral surface 12a.

The holding member 12 has an inlet port 18A and an outlet port 18B. The ports 18A and 18B are located at respective opposite sides of the holding member 12 across the valve element 11 in a direction orthogonal to the rotation axis X1 to bring a space into which the valve element 11 is inserted into communication with the outside of the holding member 12. To the inlet port 18A is connected an upstream section 3a of the flow pipe 3; to the inlet port 18B is connected a downstream section 3b of the flow pipe 3. Each of the inlet and outlet ports 18A and 18B is shaped into a circular shape having a center coincident with the axis X2 of the flow path formed by the flow pipe 3 and coinciding with an inlet opening 13a of the flow-path hole 13.

The above rotational movement about the rotation axis X1 allows the valve element 11 to move between an opening position and a close position. In the open position, the axis X3 of the flow-path hole 13 formed in the valve element 11 substantially coincides with the axis X2 of the flow path formed by the flow pipe 3 to open the flow path through the flow-path hole 13, in other words, the flow-path hole 13 brings the ports 12a, 12b into communication with each other. In the close position, the center axis X3 of the flow-path hole 13 and the center axis X2 of the flow path cross each other (for example, are orthogonal to each other) to deviate the flow-path hole 13 of the valve element 11, in a direction of the rotational movement of the valve element 11, from the flow path, thus causing the outer peripheral surface 14 of the valve element 11 to close the inlet and outlet port 18A and 18B to block the flow path.

The rotary plate 15 is a rotary member joined to an upper portion of the valve element 11 so as to make rotational movement integrally with the valve element 11. The rotary plate 15 also functions as an operation member which allows a user to apply to the valve element 11 a rotational operation for rotating the valve element 11 about the rotation axis X1 by gripping the rotary plate 15 and as a rotational indication member which indicates the rotational position of the valve element 11 to the outside.

The bolt 17 is a rotational restriction member which is engaged with the rotary plate 15 so as to restrict the rotational movement of the valve element. Specifically, the bolt 17 is fixed to the holding member 12 so as to project upward beyond an upper surface of the holding member 12 and engaged with the rotary plate 15 to restrict the rotational movement of the valve element 11 between the open position and the close position.

The rotary plate 15 is shaped in a plate having a thickness direction parallel to the rotation axis X1. The rotary plate 15 has an outer peripheral surface including a normal section 16 shaped as a circular arc occupying a range corresponding to a predetermined central angle and an engagement section 19 occupying the remaining range.

The engagement section 19 is a section capable of engagement with the bolt 17. In the embodiment, the engagement section 19 has a shape obtained by cutting out a circumferential part of a periphery of a circular plate. Specifically, the engagement section 19 has an intermediate portion 19c with a radius of curvature smaller than that of the normal section 16 and first and second restrained portions 19a and 19b located on respective opposite sides across the intermediate portion 19c. The intermediate portion 19c is shaped as a circular arc capable of making sliding contact with the bolt 17 in a direction of the rotational-movement of the valve element 11 to permit the valve element 11 to make the rotational movement between the open position and the close position. The first restrained portion 19a has a shape capable of abutting against the bolt 17 in a first direction RD1 shown in FIG. 3 (that is, a direction from the close position to the open position) so as to prevent the rotary plate 15 and the valve element connected thereto from further rotational movement at the first direction RD1 beyond the opening position shown in FIG. 3. The second restrained portion 19b has a shape capable of abutting against the bolt 17 in a second direction RD2 opposite to the first direction, as shown in FIG. 4 (that is, a direction from the open position to the close position), so as to prevent the rotary plate 15 and the valve element connected thereto from further rotational movement in the second direction RD2 beyond the opening position shown in FIG. 4.

Figure 3:
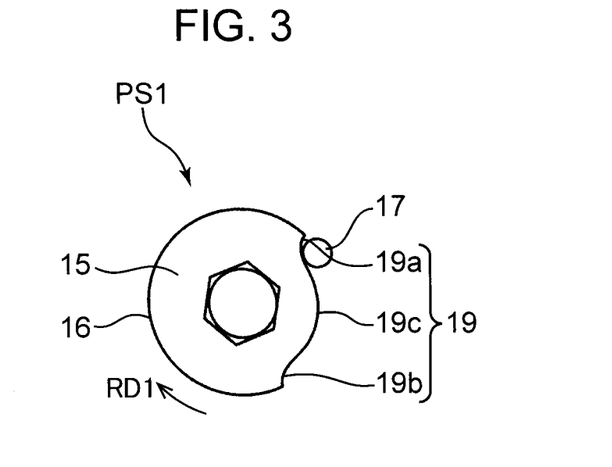
FIG. 3 is a plan view showing a relative position of a rotary plate to a rotational restriction bolt in the valve when a valve element of the valve is in an open position.

Accordingly, as shown in FIG. 3, the rotational movement of the rotary plate 15 and the valve element 11 in the first direction RD1 from the close position to the open position is stopped at the open position PS1 by the abutment of the first restrained portion 19a of the engagement section 19 against the bolt 17 in the first direction RD1. On the contrary, as shown in FIG. 4, the rotational movement of the rotary plate 15 and the valve element 11 in the second direction RD2 from the open position to the close position is stopped at the close position PS2 by the abutment of the second restrained portion 19b of the engagement section 19 against the bolt 17 in the second direction RD2.

Figure 4:
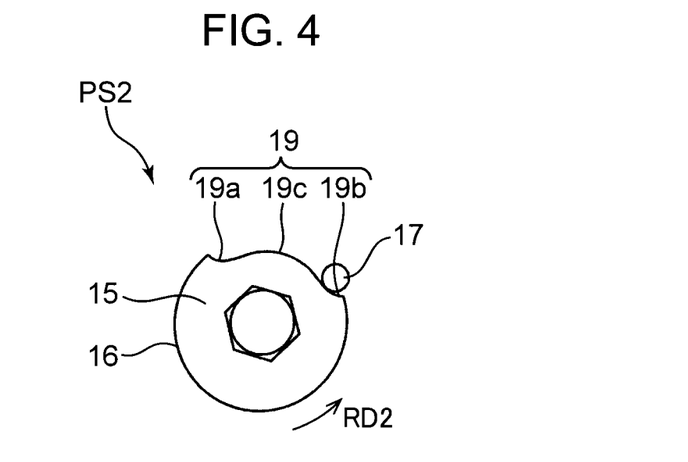
FIG. 4 is a plan view showing a relative position of the rotary plate to the rotational restriction bolt in the valve when the valve element of the valve is in a close position.

The rotary plate 15 and the bolt 17, thus collaborating with each other, function as means of stopping the valve element 11 at each of the open position PS1 shown in FIG. 3 and the close position shown in FIG. 4, in other words, as a rotational restriction section for restricting the rotational range of the valve element 11 between the positions PS1 and PS2.

Figure 5A:
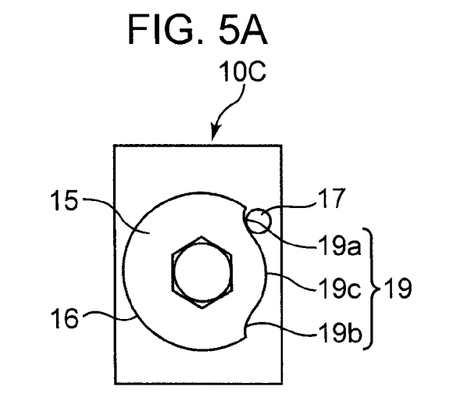
FIG. 5A is a plan view of a valve according to a comparison example when the valve element of the valve is in an open position.
Figure 5B:
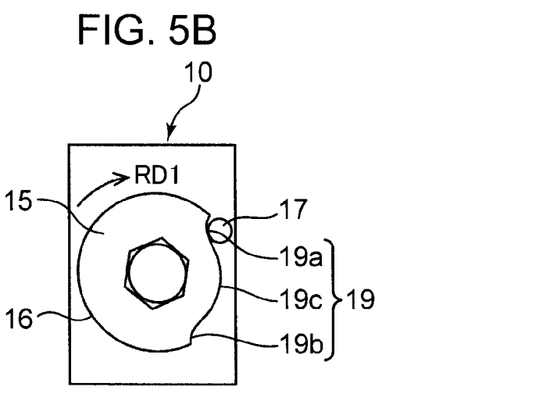
FIG. 5B is a plan view of the valve when the valve element of the valve according to the embodiment is in the open position.
Figure 6A:
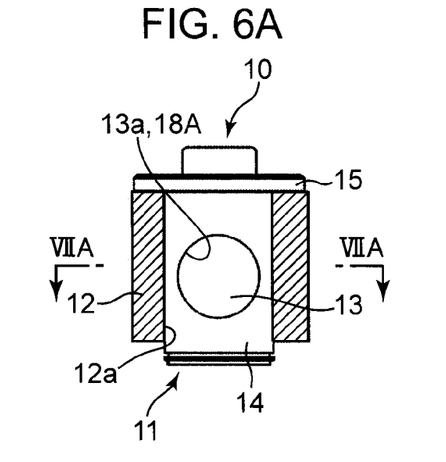
FIG. 6A is a partially cross-sectional front view of the valve according to the comparison example when the valve element of the valve according to the comparison example is in the open position.
Figure 6B:
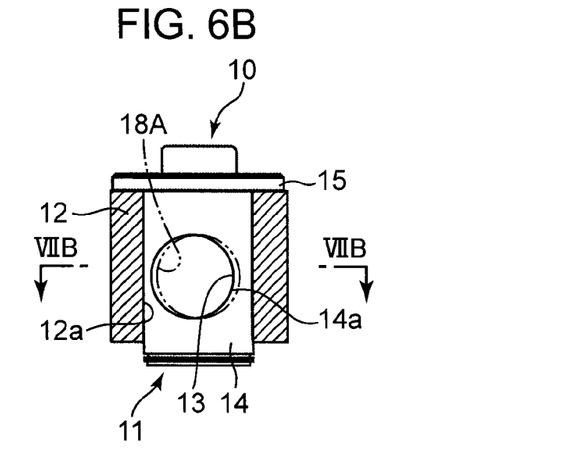
FIG. 6B is a partially cross-sectional front view of the valve according to the embodiment when the valve element of the valve according to the embodiment is in the open position.
Figure 7A:
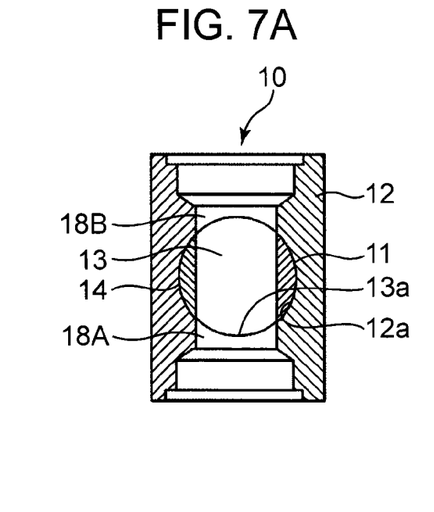
FIG. 7A is a plan view of a cross section taken along line VIIA-VIIA in FIG. 6A.

Subsequently will be described a more specific explanation about the open position PS1 of the valve element 11 in the valve 10. FIG. 5A is a plan view for showing a position of a rotary plate 15 in a valve 10C according to a comparison example when a valve element 11 therein is in an open position PS1, while FIG. 5B is a plan view for showing the position of the rotary plate 15 in the valve 10 according to the embodiment when the valve element 11 therein is in the open position PS1. FIG. 6A is a cross-sectional front view for showing a state where the valve element 11 of the valve 10C according to the comparison example is in the open position PS1, while FIG. 6b is a cross-sectional front view for showing a state where the valve element 11 of the valve 10 according to the embodiment is in the open position PS1. FIG. 7A is a plan view of a cross section taken along line VIIA-VIIA in FIG. 6A, while FIG. 7B is a plan view of a cross section taken along line VIIB-VIIB in FIG. 6B.

Figure 11A:
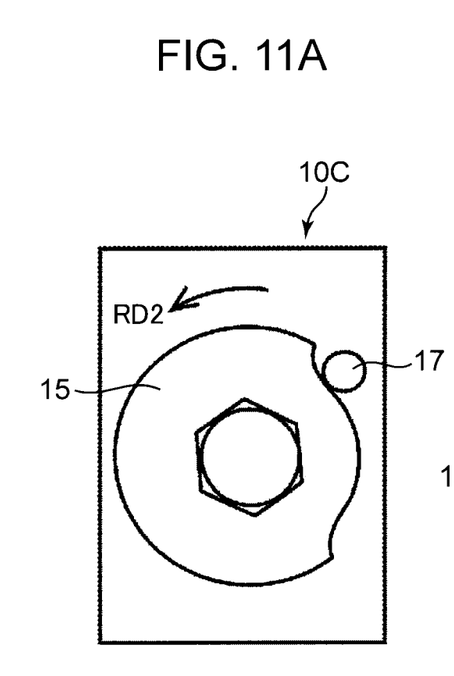
FIGS. 11A to 11C are respective plan views showing respective relative position of a rotary plate to the rotational restriction bolt of the rotational restriction section in respective rotational positions of the valve according to the comparison example.
Figure 11B:
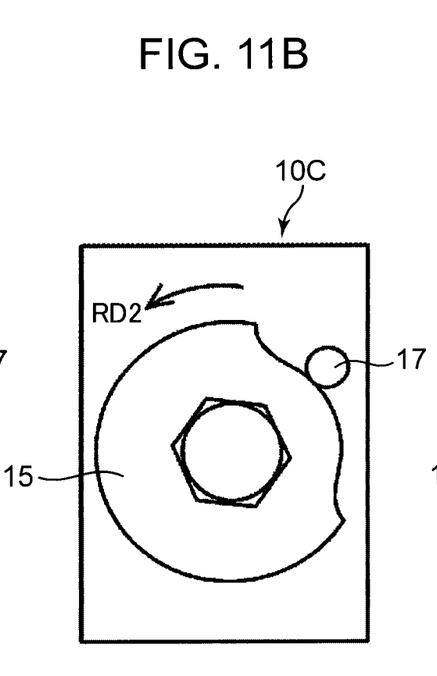
Figure 11C:
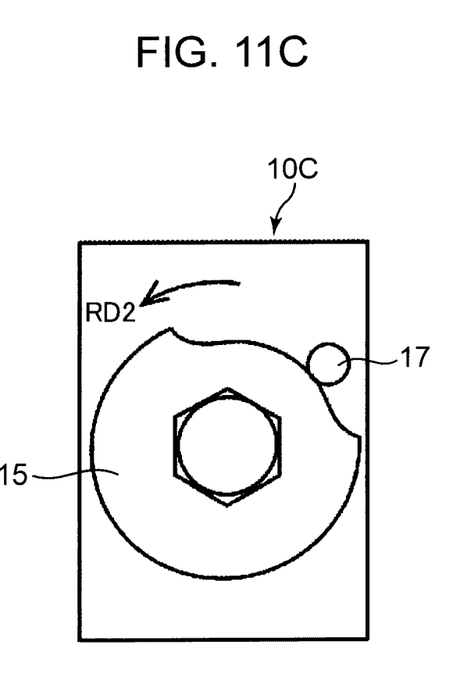
Figure 12A:
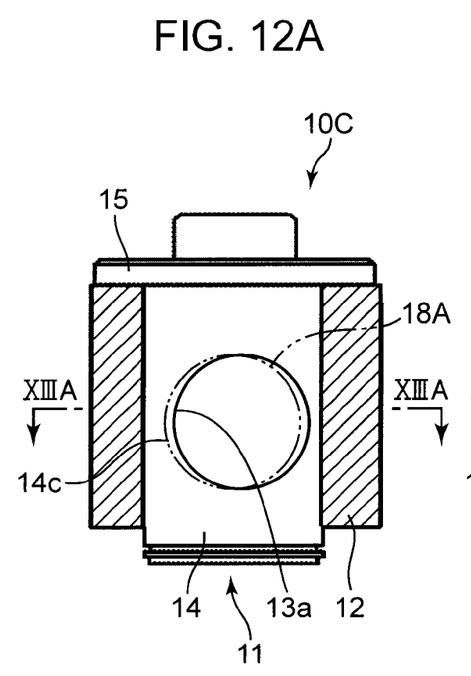
FIGS. 12A to 12C are respective partially cross-sectional front views showing respective opening degrees of a flow-path hole of the valve element in respective rotational positions corresponding to FIGS. 11A to 11C.
Figure 12B:
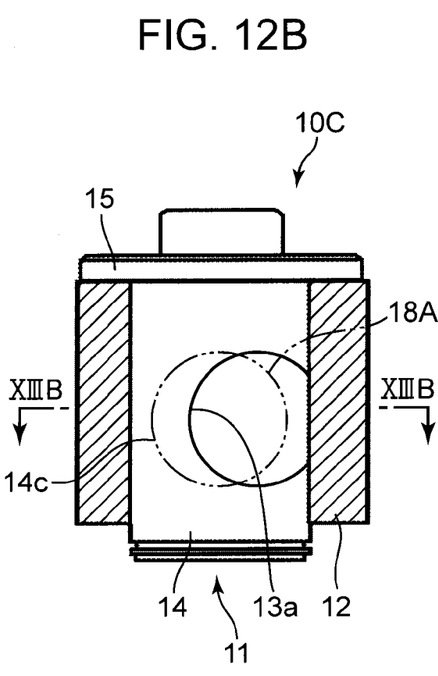
Figure 12C:
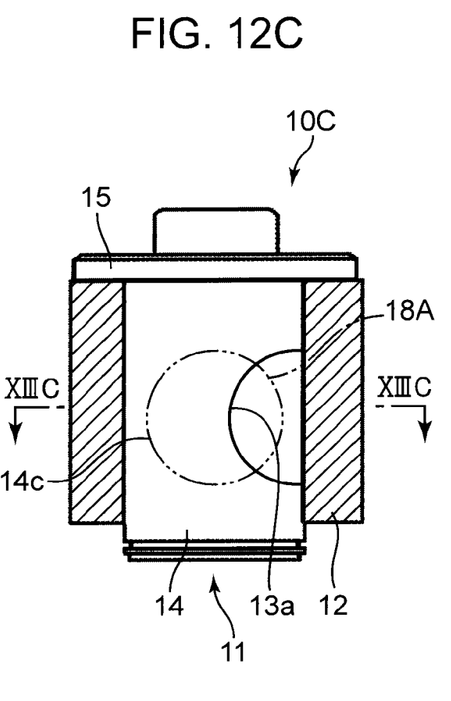
Figure 13A:
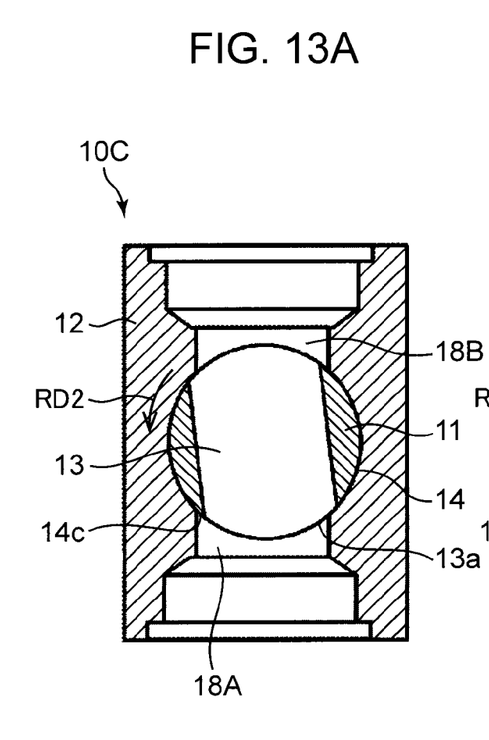
FIG. 13A is a plan view of a cross section taken along line XIIIA-XIIIA in FIG. 12A.
Figure 13B:
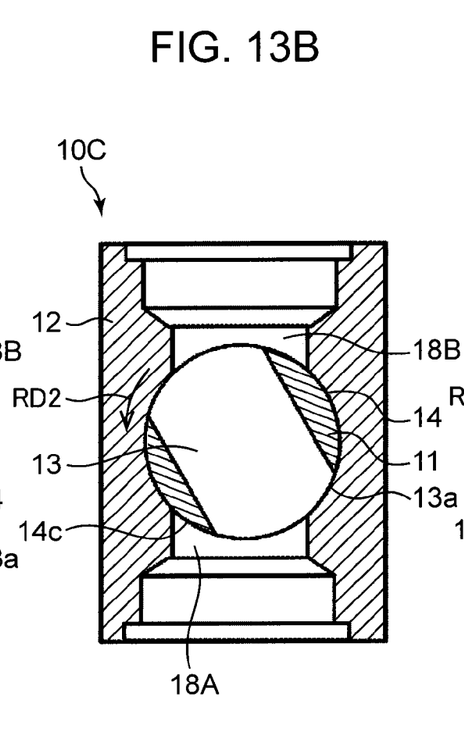
FIG. 13B is a plan view of a cross section taken along line XIIIB-XIIIB in FIG. 12B.
Figure 13C:
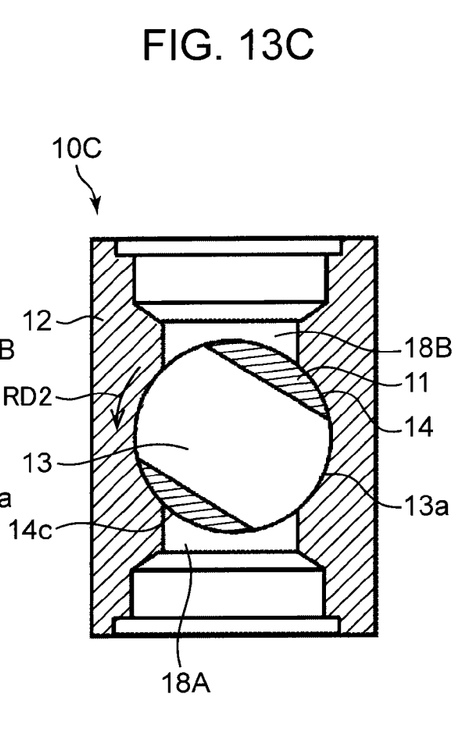
FIG. 13C is a plan view of a cross section taken along line XIIIC-XIIIC in FIG. 12C.

In the valve 10C according to the comparison example wherein an inlet opening 13a of a flow-path hole 13 in the opening position coincides with an inlet port 18A as shown in FIGS. 5A, 6A and 7A, there is a possibility of unintentional rotational movement of the valve element 11 from the opening position PS1 toward the close position PS2 due to the influence of liquid passing through the flow-path hole 13. Specifically, in the valve 10C according to the comparison example, even when the valve element 11 makes only a slight rotational movement in a second direction RD2 from the open position to the close position, as shown in FIG. 11A, by receiving the pressure of the liquid passing through the flow-path hole 13 of the valve element 11 caused by the pressure, a part 14c of an outer peripheral surface 14 of the valve element 11, the part 14c surrounding the flow-path hole 13 and being located forward with respected to the first direction RD1, comes to overlap the inlet port 18A as shown in FIGS. 12A and 13A. The further action of the pressure of the liquid on the part 14A causes gradual advance of the rotational movement of the valve element 11 toward the close position, as shown in FIGS. 11B, 12B and 13B and further in FIGS. 11C, 12C and 13C, thus generating an ultimate possibility of close of the valve 10C.

Figure 7B:
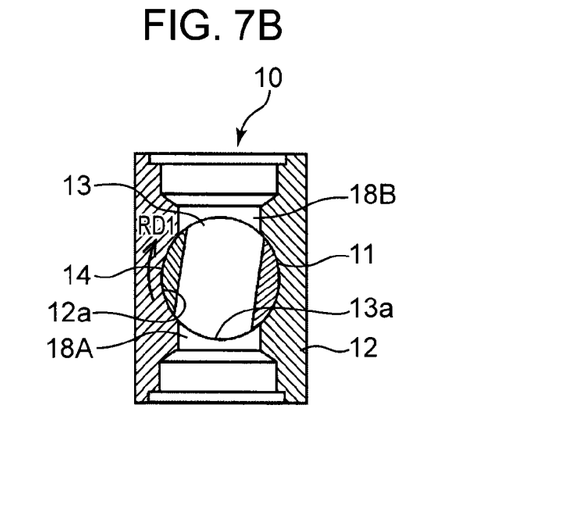
FIG. 7B is a plan view of a cross section taken along line VIIB-VIIB in FIG. 6B.

On the other hand, in the valve 10 according to the embodiment shown in FIGS. 5B, 6B and 7B, the open position PS1 of the valve element 11 is set to a position where the inlet opening 13a of the flow-path hole 13 is deviated from the inlet port 18A (indicated by two-dot line in FIG. 6B) in the first direction RD1 in some degree. In other words, the relative position of the bolt 17 to the rotary plate 15 is preset so as to cause the first restrained portion 19a of the rotary plate 15 to abut against the bolt 17 as shown in FIG. 5B at a position shown in FIGS. 6B and 7B advanced in the first direction RD1 beyond the position where the center of the inlet opening 13a is coincident with that of the inlet port 18A similarly to the inlet opening 13a shown in FIGS. 6A and 7A.

Thus presetting the open position PS1 allows the specific part 14a of the outer peripheral surface 14 of the valve element 11 to overlap the inlet port 18A in the open position PS1. The specific part 14a is a part which is located on a rear side of the flow-path hole 13 with respect to the first direction RD1 so as to receive the pressure of the liquid having passed through the inlet port 18A to allow the pressure to further impart a rotational bias in the first direction RD1 to the valve element 11 in the open position PS1. The pressure of the liquid is thus allowed to act on the valve element 11 in the open position PS1 as a force which presses the first restrained portion 19a of the rotary plate 15 against the bolt 17, that is, as a force which retains the valve element in the open position PS1. The force effectively restrains the problem of unintentional rotational movement of the valve element 11 to close the valve 10 from occurrence. The area of the specific part 14a for obtaining the effect, that is, the area of the part which is a part of the outer peripheral surface 14 of the valve element 11 and which appears in the inlet port 18A when the valve element 11 is in the open position, can be determined through consideration of pressure loss and others.

As described above, the valve 10 according to the embodiment allows the rotational restriction section based on the combination of the rotary plate 15 and the bolt 17 to generate greatly advantageous effect of preventing the valve 10 from its unintentional close only by suitably presetting the positional relationship between the rotary plate 15 and the bolt 17. In other words, the valve 10 can be prevented from unintentional close without any significant complication of the structure.

The valve and the construction machine according to the invention should not be limited to the above embodiment but be permitted to be varied or modified in the scope of the claims.

The rotational restriction section should not be limited to the combination of the rotary plate 15 and the bolt 17 in the above embodiment. For example, the bolt 17 can be replaced with other shaft-like member. Furthermore, it is also possible to connect a shaft-like member to a valve element so as to let the shaft-like member make rotational movement integrally with the valve element while providing to a holding member a projection for restricting the rotational movement of the shaft-like member. Besides, the rotational restriction section according to the invention should not be limited to one capable of being used as an operation member or a rotation indication member. The rotational restriction section is, therefore, also permitted to be disposed inside the holding member.

The rotational restriction section according to the invention only has to prevent the valve element at its open position from rotational movement in the first direction of the valve element, thus not necessarily required to have also a function of preventing the valve element at its close position from rotational movement in the second direction. For example, the rotary plate 15 in the above embodiment is also permitted to have a shape including an outward projection at the position corresponding to the first restrained portion 19a, the projection being capable of abutting against the bolt 17 to thereby prevent the valve element from rotational movement in the first direction.

In the invention, respective shapes of the inlet opening of the flow-path hole and the inlet port of the holding member are not necessarily required to be coincident with each other. For example, also in the case where the inlet opening is smaller than the inlet port, it is possible to set the opening position so as to allow the pressure of the liquid having passed through the inlet port to impart a rotational bias in the first direction to the valve element in the open position. Specifically, the close position can be set so as to make a first force exerted by the liquid on a first part of the outer peripheral surface of the valve element, the first part lying on the front side of the inlet opening of the flow-path hole with respect to the first direction, be greater than a second force exerted by the liquid on a second part of the outer peripheral surface of the valve element, the second part lying on the rear side of the inlet opening of the flow-path hole with respect to the first direction, generally, so as to make a second area of the second part overlapping the inlet port on the rear side of the inlet opening be larger than a first area of the first part overlapping the inlet port on the front side of the inlet opening.

While the valve 10 according to the embodiment is used as a stop valve in a construction machine, the invention can be applied to various valves other than the stop valve, e.g., select valves.

As described above, there can be provided a valve including a valve element and being capable of suppressing unintentional rotational movement of the valve element from an open position to a close position. Provided is a valve which is provided midway of a flow pipe forming a flow path in order to regulate a flow of liquid in the flow path, the valve including: a valve element having a cylindrical outer peripheral surface centered around a rotation axis orthogonal to a direction of the flow path of the flow pipe, the valve element formed with a flow-path hole penetrating the valve element orthogonally to the rotation axis; a holding member holding the valve element while keeping close contact with the outer peripheral surface of the valve element, so as to permit the valve element to make rotational movement about the rotation axis in a first direction and in a second direction opposite to the first direction, the holding member having an inlet port to be connected to an upstream section of the flow pipe and an outlet port to be connected to a downstream section of the flow pipe, the inlet port and the outlet port located on respective opposite sides of the holding member across the valve element in a direction orthogonal to the rotation axis; and a rotational restriction section which restricts the rotational movement of the valve element about the rotation axis. The valve element has an open position where the flow-path hole brings the inlet port and the outlet port into communication with each other to open the flow path and a close position where the flow-path hole is deviated from the inlet port and the outlet port in a direction of the rotational movement to make the valve element block the communication between the inlet port and the outlet port to thereby close the flow path. The rotational restriction section restricts the rotational movement of the valve element so as to stop the rotational movement of the valve element in the first direction at the open position. The open position is a position where the outer peripheral surface of the valve element overlaps the inlet port in a specific part of the outer peripheral surface, the specific part being a part lying at a rear side of the flow-path hole with respect to the first direction so as to receive pressure of the liquid having passed through the inlet port to allow the pressure to impart a rotational bias in the first direction to the valve element in the open position.

According to the valve, it is possible to retain the valve element surely in the open position by utilization of the pressure of liquid flowing in the flow pipe. Specifically, the specific part of the outer peripheral surface of the valve element in the open position, located on the rear side of the flow-path hole with respect to the first direction, can receive the pressure of liquid having passed through the inlet port to thereby allow the pressure to be exerted as a force which imparts a rotational bias in the first direction to the valve element in the open position, thus restraining the problem of unintentional rotational movement of the valve element from the open position to the close position to close the valve from occurrence.

Specifically, in the case where the flow-path hole has a circular inlet opening and the inlet port is circular, it is preferable that the open position of the valve element is set to a deviated position which is deviated in the first direction beyond a position where a center of the inlet opening is coincident with a center of the inlet port.

Besides, the rotational restriction section is, preferably, configured to stop the rotational movement of the valve element in the second direction at the close position to thereby restrict the rotational range of the valve element between the open position and the close position.

For example, the rotational restriction section preferably includes a rotary member joined to the valve element so as to make rotational movement integrally with the valve element and a rotational restriction member provided to the holding member to be engaged with the rotary member so as to restrict the rotational movement, the rotational restriction section being configured to abut against the rotary member making rotational movement integrally with the valve element in the first direction at a position corresponding to the open position to thereby prevent the valve element from further rotational movement in the first direction beyond the open position.

The rotational restriction section allows the open position of the valve element to be easily determined by presetting of the positional relationship between the rotary member and the rotational restriction member.

It is more preferable that the rotational restriction section is further configured to abut against the rotary member making rotational movement integrally with the valve element in the second direction at a position corresponding to the close position to thereby prevent the valve element from further rotational movement in the second direction beyond the close position.

According to the present invention, also provided is a construction machine operated through hydraulic liquid, the construction machine including a flow pipe forming a flow path for the hydraulic liquid and the above-described valve, the valve being provided midway of the flow pipe to regulate flow of liquid in the flow pipe.

This application is based on Japanese Patent application No. 2014-012026 filed in Japan Patent Office on Jan. 27, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A valve provided midway of a flow pipe forming a flow path in order to regulate a flow of liquid in the flow path, the valve comprising:
   a valve element having a cylindrical outer peripheral surface centered around a rotation axis orthogonal to a direction of the flow path of the flow pipe, the valve element formed with a flow-path hole penetrating the valve element orthogonally to the rotation axis;
   a holding member holding the valve element while keeping close contact with the outer peripheral surface of the valve element, so as to permit the valve element to make rotational movement about the rotation axis in a first direction and in a second direction opposite to the first direction, the holding member having an inlet port to be connected to an upstream section of the flow pipe and an outlet port to be connected to a downstream section of the flow pipe, the inlet port and the outlet port located on respective opposite sides of the holding member across the valve element in a direction orthogonal to the rotation axis; and
   a rotational restriction section which restricts the rotational movement of the valve element about the rotation axis, wherein:
   the valve element has an open position where the flow-path hole brings the inlet port and the outlet port into communication with each other to open the flow path and a close position where the flow-path hole is deviated from the inlet port and the outlet port in a direction of the rotational movement to make the valve element block the communication between the inlet port and the outlet port to thereby close the flow path;
   the rotational restriction section restricts the rotational movement of valve element so as to stop the rotational movement of the valve element in the first direction at the open position; and
   the open position is a position where the outer peripheral surface of the valve element overlaps the inlet port in a specific part of the outer peripheral surface, the specific part being a part lying at a rear side of the flow-path hole with respect to the first direction so as to receive pressure of the liquid having passed through the inlet port to allow the pressure to impart a rotational bias in the first direction to the valve element in the open position.

2. The valve according to claim 1, wherein: the flow-path hole has a circular inlet opening; the inlet port is circular; and the open position of the valve element is set to a deviated position which is deviated in the first direction beyond a position where a center of the inlet opening is coincident with a center of the inlet port.

3. The valve according to claim 1, wherein the rotational restriction section is configured to stop the rotational movement of the valve element in the second direction at the close position to thereby restrict the rotational range of the valve element between the open position and the close position.

4. The valve according to claim 1, wherein the rotational restriction section includes a rotary member joined to the valve element so as to make rotational movement integrally with the valve element and a rotational restriction member provided on the holding member to be engaged with the rotary member so as to restrict the rotational movement, the rotational restriction section being configured to abut against the rotary member making rotational movement integrally with the valve element in the first direction at a position corresponding to the open position to thereby prevent the valve element from further rotational movement in the first direction beyond the open position.

5. The valve according to claim 4, wherein the rotational restriction section is configured to abut against the rotary member making rotational movement integrally with the valve element in the second direction at a position corresponding to the close position to thereby prevent the valve element from further rotational movement in the second direction beyond the close position.

6. A construction machine configured to be operated through hydraulic liquid, the construction machine comprising:
   a flow pipe forming a flow path for the hydraulic liquid; and
   the valve according to claim 1, the valve being provided midway of the flow pipe to regulate flow of the hydraulic liquid in the flow pipe.

7. The construction machine according to claim 6, wherein: the flow-path hole has a circular inlet opening; the inlet port is circular; and the open position of the valve element is set to a deviated position which is deviated in the first direction beyond a position where a center of the inlet opening is coincident with a center of the inlet port.

8. The construction machine according to claim 6, wherein the rotational restriction section is configured to stop the rotational movement of the valve element in the second direction at the close position to thereby restrict the rotational range of the valve element between the open position and the close position.

9. The construction machine according to claim 6, wherein the rotational restriction section includes a rotary member joined to the valve element so as to make rotational movement integrally with the valve element and a rotational restriction member provided on the holding member to be engaged with the rotary member so as to restrict the rotational movement, the rotational restriction section being configured to abut against the rotary member making rotational movement integrally with the valve element in the first direction at a position corresponding to the open position to thereby prevent the valve element from further rotational movement in the first direction beyond the open position.

10. The construction machine according to claim 9, wherein the rotational restriction section is configured to abut against the rotary member making rotational movement integrally with the valve element in the second direction at a position corresponding to the close position to thereby prevent the valve element from further rotational movement in the second direction beyond the close position.

* * * * *